United States Patent [19]
Ohmayer et al.

[11] 3,827,536
[45] Aug. 6, 1974

[54] BRAKE LINING WEAR ADJUSTING DEVICE

[75] Inventors: Siegfried Ohmayer, Offenbach; Karl Störzel, Sprendlingen, both of Germany

[73] Assignee: ITT Industries, Inc., New York, N.Y.

[22] Filed: Mar. 23, 1973

[21] Appl. No.: 344,019

[30] Foreign Application Priority Data
Apr. 19, 1972 Germany.............................. 2218929

[52] U.S. Cl............................ 188/196 F, 188/71.9
[51] Int. Cl............................................ F16d 65/56
[58] Field of Search ........... 188/71.8, 71.9, 196 BA, 188/196 D, 196 P, 196 F, 79.5 GE

[56] References Cited
UNITED STATES PATENTS

| | | | |
|---|---|---|---|
| 3,186,521 | 6/1965 | Chouings | 188/71.8 X |
| 3,277,983 | 10/1966 | Jeffries | 188/196 P |
| 3,467,227 | 9/1969 | Belart | 188/196 F |
| 3,550,732 | 12/1970 | Beller | 188/71.9 X |

FOREIGN PATENTS OR APPLICATIONS
1,180,137  2/1970  Great Britain..................... 188/71.9

Primary Examiner—Duane A. Reger
Attorney, Agent, or Firm—John T. O'Halloran; Menotti T. Lombardi, Jr.; Alfred C. Hill

[57] ABSTRACT

This relates to an adjusting device to compensate for brake lining wear. In known adjusting devices there is provided an additional part releasably connected in an actuating piston to serve as a safety device if the piston stroke is excessive. According to the present invention this additional part is eliminated by providing a driving bushing with a friction surface shaped like a cone. This conical friction surface is enlarged in a direction opposite to the adjusting direction. This conical friction surface directly engages a conical friction surface present on the inner surface of the actuating piston.

6 Claims, 2 Drawing Figures under 3,827,536

BRAKE LINING WEAR ADJUSTING DEVICE

BACKGROUND OF THE INVENTION

This relates to an adjusting device and more particularly to a brake lining wear adjusting device.

A first form of adjusting device includes an adjusting nut rotational along a self-locking thread of an adjusting spindle cooperating to limit the return movement of an actuating piston designed as a trunk piston having a one-sided piston bore. The adjusting nut grips by means of a pin a slot of driving bushing which is adjusted axially shiftable and rotatable with respect to the longitudinal axis of the spindle. The slot extends diagonally to this longitudinal axis. The driving bushing includes a conical friction surface which abuts against a respective friction surface of a construction part which is firmly connected with the actuating piston. A spring is provided which causes the driving bushing to follow the motion that causes the friction surfaces to move away from each other during the return stroke of the piston. The friction surfaces are dimensioned in such a way that, when the actuating piston moves against the friction surface of the driving bushing, the driving bushing is less easily rotatable than the adjusting nut in the thread. However, in reverse rotating direction, an easier rotation of the driving bushing is possible.

Such an adjusting device is disclosed in German Pat. DT-OS 1,921,898.

During the forward movement of the actuating piston, the friction surface of the construction part, which is firmly connected with the actuating piston, is pressed against the respective friction surface of the driving bushing. Thus, the driving bushing is secured against torsional movement. This has a result that, during further forward movement, the pin of the adjusting nut slides along the diagonally extending slot of the driving bushing and the adjusting nut is turned so that an adjustment is caused.

During the back-stroke of the actuating piston the friction surface of the construction part, which is firmly connected with the piston, moves away from the friction surface of the driving bushing. Because of the tension of a torsion spring, the driving bushing is in a position to turn during further back-stroke of the actuating piston so that its slanting slot slides along the pin of the adjusting nut. However the pin itself does not perform any rotational movement because, when the friction surfaces are not in mutual contact, the adjusting nut is harder to turn that the driving bushing.

It is a disadvantage of this first known adjusting device to be relatively complicated and consequently subject to malfunctioning.

This disadvantage is overcome by a second known adjusting device by simplifying the construction of the first known adjusting device. The simplified construction is achieved by providing a first stop adjacent the end of the adjusting nut spaced from the adjusting spindle and second stop with a return spring provided between the first and second stops.

SUMMARY OF THE INVENTION

It is an object of the present invention to further simplify an adjusting device of the above mentioned type without altering the operation thereof.

According to the invention this object is achieved by providing a driving bushing having as a friction surface a cone enlarging in a direction opposite direction to the adjusting direction which abuts against a cooperating conical shoulder serving as non-rotatable friction surface. This construction eliminates the separate construction element serving as a connecting link between the actuating piston and the adjusting device. Both the known adjusting devices mentioned hereinabove require this separate construction element, in order that the adjusting device will not be in danger of being destroyed in case the actuating piston should move too far out of its brake cylinder. This separate constructional element was connected to the actuating piston by means of a clamp ring. During normal operation the established connection is considered rigid. Only when the piston stroke becomes excessive, the clamp ring opens the connection to the actuating piston so that the latter can slide over the separate construction element without causing damage.

A feature of the present invention is the provision of a brake lining wear adjusting device comprising: at least a first brake actuating piston having a longitudinal axis, a longitudinal blind bore disposed within the piston and coaxially of the axis and a first conical friction surface disposed on the inner surface of the bore spaced from the blind end of the bore, the first friction surface being enlarged in a direction opposite to an adjusting direction; an adjusting spindle projecting into the bore coaxial of the axis, the spindle having a self-locking thread thereon; an adjusting nut disposed coaxial of the axis within the bore rotatable on the thread, the adjusting nut having a pin extending radially outward therefrom; a driving bushing disposed about the adjusting nut coaxial of the axis, the bushing being shiftable along and rotatable about the axis, the bushing having a slot engaging the pin, the slot extending diagonal with respect to the axis, the bushing having a second conical friction surface on an end thereof capable of engaging the first friction surface, the second friction surface likewise being enlarged in a direction opposite to an adjusting direction; and a spring interconnecting the bushing and the nut, the spring prestressing the bushing toward the first friction surface.

Due to the fact that, according to the present invention, the cone of the driving bushing is enlarged in a direction opposite to the adjusting direction, the actuating piston can slide over the adjusting device in the control direction without restriction, while, according to the above-mentioned two prior art adjusting devices, the actuating pin ran against the cone of the adjusting device.

Another feature of the present invention is that the adjusting nut for the adjusting device of a brake, which is not provided with any return springs, is equipped with a head with an annular groove therein. A clamp ring is inserted into this annular groove and a cooperating encircling groove of the piston bore. According to this construction the clamp connection between the actuating piston and the adjusting device, which formerly needed a separate construction element, is provided on the adjusting nut itself. This results in a considerable simplification of the adjusting device.

The encircling groove of the piston bore is provided with a supply surface having a slope opposite to the control direction of the actuating piston. This enables the clamp ring to act simultaneously as the return spring, thus, eliminating additional springs. This provides a less expensive contructional arrangement. A further advantage of the present invention is that a special retaining ring on the adjusting nut can be eliminated since the adjusting device of the present invention does not comprise any parts which could fall out in case of the actuating piston is moved too far.

Should the adjusting device of this invention be used for a shoe drum brake, the adjusting spindle is, according to the present invention, disposed in one actuating piston and secured against rotational movement and the adjusting nut with a head in a piston bore of the other actuating piston is connected via a clamp ring shaped into a slipper clutch with the other actuating piston.

This constructional arrangement results in a further simplificaton in comparison to the above-mentioned prior art constructional arrangements since the restoring forces of the return spring of the shoe drum brake make an additional return spring in the adjusting device superfluous. A special advantage of the constructional arrangement of the present invention is provided by replacing rotation spring of the above-mentioned prior art arrangement with a prestressed conical spring supporting itself between a recess of the adjusting nut and an external frontal area of the driving bushing.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
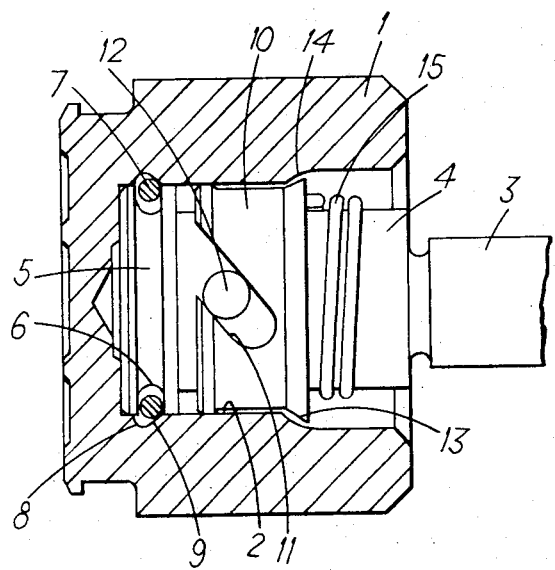
FIG. 1 shows a longitudinal cross-sectional view, partially in elevation, through an actuating piston having an adjusting device according to the principles of the present invention.

FIG. 1 shows an actuating piston 1 which is axially shiftable by means of hydraulic forces in a non-illustrated brake cylinder housing. Actuating piston 1 is designed as a trunk piston with a piston bore 2 into which an adjusting spindle 3 projects. Spindle 3 is connected with an equally not illustrated brake saddle which prevents rotational movement of spindle 3. An adjusting nut 4 with axial thread clearance is screwed onto adjusting spindle 3 in a self-locking thread (not illustrated). This axial thread clearance corresponds with the necessary brake clearance. Adjusting nut 4 has a head 5 with approximately the same diameter as piston bore 2. A clamp ring 7 is placed into an encircling groove in this head, said clamp ring 7 being gripped by a cooperating encircling groove 8 in the inner surface of piston bore 2. The clamp ring is outwardly radially prestressed so that in rest position a connection between actuating piston 1 and adjusting nut 4 is provided. The encircling groove 8 has a supply surface 9 having a slope opposite to the adjusting direction of control piston 1. For proper operation of this adjusting device, it is also of importance that the encircling groove 6 be so deep that clamp ring 7 can completely embed itself in encircling groove 6.

A driving bushing 10 with a slot 11 extending diagonally to the roll or longitudinal axis of the adjusting device is slid onto adjusting nut 4.

A pin 12 of the adjusting nut 4 projects into slot 11. The driving bushing 10 is provided with a cone 13 at the end thereof spaced from head 5 of the adjusting nut. Cone 13 enlarges in a direction opposite to the adjusting direction. Cone 13 abuts against a correspondingly shaped conical shoulder 14 on the inner surface of actuating piston 1.

A further detail of the adjusting device that should be mentioned is a rotation spring 15 which has one end thereof attached to adjusting nut 4 and its other end attached to driving bushing 10 in such a way that a torque is constantly applied to driving bushing 10 so that it will follow conical shoulder 14 when actuating piston 1 is moving for application of the brakes.

The operation of the above described adjusting device is as follows:

As long as the brake lining is not yet worn, the piston stroke of actuating piston 1 corresponds with axial thread clearance between adjusting nut 4 and threaded spindel 3. It is not necessary that the adjusting device comes into action at this time. When piston 1 is moved to the left by hydraulic pressure, clamp ring 7 causes adjusting nut 4 with head 5 to follow this movement due to the axial clearance in the thread, Driving bushing 10 also follows this movement without losing contact with conical shoulder 14 and without rotating.

Upon releasing the brake piston 1 moves back to the right or its original position.

In case that a larger piston stroke should be necessary due to brake lining wear, the axial movement of piston 1 is larger than the axial clearance in the thread and adjusting nut 4 will be unable to follow piston 1. Also driving bushing 10 will not follow piston 1. Simultaneously, actuating piston 1 presses clamp ring 7 a given amount into groove 8 via supply surface 9. Conical shoulder 14 moves away from cone 13. At this moment, frictional engagement between piston 1 and bushing 10 is eliminated. Due to the inclination of slot 11 and the forces of rotating spring 15, driving bushing 10 begins to rotate in a clockwise direction and in so rotating follows piston 1 so that contact between conical shoulder 14 and cone 13 is reestablished.

Adjusting nut 4 is not rotated since driving bushing 10 can be more easily rotated than adjusting nut 4.

When the actuating pressure is decreased, clamp ring 7 forces piston 1 back into its original position. Conical shoulder 14 rests against cone 13 of driving bushing 10. Because piston 1 cannot rotate and the contact between busing 10 and piston 1 is of the frictional engagement type, bushing 10 will not rotate during backward movement of piston 1. When bushing 10 moves to the right without rotating, slot 11 causes pin 12 to turn nut 4 in a clockwise direction. This is the adjusting step of the device.

The primary operating feature of the adjusting device is that bushing 10 rotates during forward movement of piston 1, but does not rotate during backward movement. Rotation during forward movement is caused by rotation spring 15 and by the fact that shoulder 14 tends to disengage cone 13. During backward movement of piston 1, shoulder 14 always acts against cone 13 because forces from piston 1 to bushing 10 and, via pin 12, to nut 4 are transmitted via shoulder 14 and cone 13.

Figure 2:
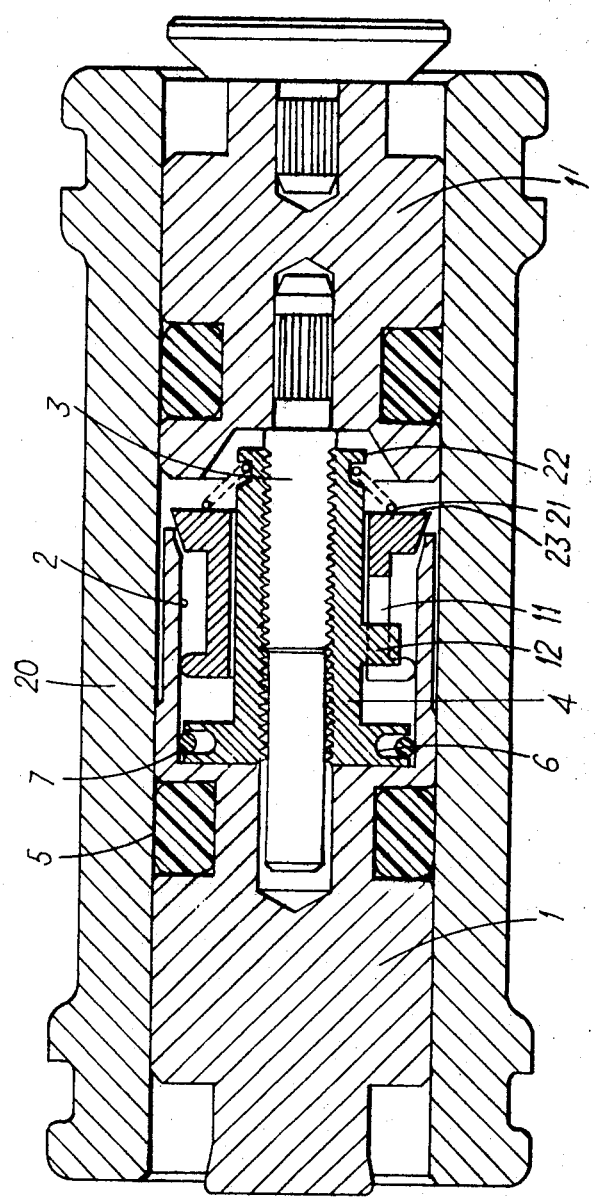
FIG. 2 shows a longitudinal cross-sectional view, partially in elevation through an adjusting device according to the principles of the present invention disposed in the brake cylinder of a shoe drum brake.

The adjusting device according to this invention is furthermore simplified when it is installed in wheel cylinders of shoe drum brakes. This is illustrated in FIG. 2. A wheel cylinder 20 includes two actuating pistons 1 and 1' which are axially movable therein. Actuating piston 1 can be considered functionally equal to actuating piston 1 of the arrangement illustrated in FIG. 1. Actuating piston 1 of FIG. 2 also includes a longitudinal bore 2 into which adjusting spindle 3 with adjusting nut 4 is projecting. Adjusting spindle 3 is connected with the actuating piston 1' in a manner that will not permit rotational movement. Thus, actuating piston 1' corresponds to the brake saddle which is not illustrated in FIG. 1.

Adjusting nut 4 of FIG. 2 also has a head 5 with an encircling groove 6 into which a clamp ring 7 is fitted. However, in the arrangement of FIG. 2 the encircling groove in the piston bore inner surface can be eliminated, since clamp ring 7 has merely the task to form a slipper clutch for adjusting nut 4 in piston bore 2 and does not in addition have to act as a return spring.

The design of driving bushing 10 corresponds exactly with the one illustrated in FIG. 1. It possesses a slot 11 extending diagonally with respect to the roll or longitudinal axis into which pin 12 of adjusting nut 4 projects. However, while the adjusting nut of FIG. 1 was caused to follow the actuating piston by means of a torsion spring, here a prestressed conical spring 21 is provided between a recess 22 of adjusting nut 4 and an exterior front surface 23 of the driving bushing 10.

The operation of this arrangement corresponds exactly with that of the arrangement of FIG. 2.

The nominal clearance which is considerably larger in shoe drum brakes than at disc brakes is provided in the arrangement of FIG. 2 by means of the clearance of pin 12 in slot 11. Due to this clearance no rotational movement of the driving bushing is caused when the brakes are applied, so that an adjustment will not take place during the return piston stroke.

With respect to the friction surfaces it should be mentioned for both arrangements of FIGS. 1 and 2 that it is also within the scope of the invention to choose instead of the conical shape another shape in as much as the operation remains unchanged.

While we have described above the principles of our invention in connection with specific apparatus, it is to be clearly understood that this description is made only by way of example and not as a limitation to the scope of our invention as set forth in the objects thereof and in the accompanying claims.

We claim:
1. A brake lining wear adjusting device comprising:

at least a first brake actuating piston having a longitudinal axis, a longitudinal blind bore disposed within said piston and coaxially of said axis and a first conical friction surface disposed on the inner surface of said bore spaced from the blind end of said bore, said first friction surface being enlarged in a direction opposite to an adjusting direction;

an adjusting spindle projecting into said bore coaxial of said axis, said spindle having a self-locking thread thereon;

an adjusting nut disposed coaxial of said axis within said bore rotatable on said thread, said adjusting nut having a pin extending radially outward therefrom;

a driving bushing disposed about said adjusting nut coaxial of said axis, said bushing being shiftable along and rotatable about said axis, said busing having a slot engaging said pin, said slot extending diagonal with respect to said axis, said bushing having a second conical friction surface on an end thereof capable of engaging said first friction surface, said second friction surface likewise being enlarged in a direction opposite to an adjusting direction; and a spring interconnecting said bushing and said nut, said spring prestressing said bushing toward said first friction surface.

2. A device according to claim 1, wherein
said nut includes
a head adjacent the blind end of said bore, and
a first encircling groove disposed in said head; and
said bore includes
a second encircling groove disposed in the inner surface of said bore registered with said first groove; and further including
a clamp ring disposed in each of said first and second grooves.

3. A device according to claim 2, wherein
said second groove includes
a supply surface sloping in a direction opposite to the actuating direction of said piston.

4. A device according to claim 3, wherein
said spring includes
a torsional spring surrounding said nut, one end of said torsional spring being connected to said nut and the other end of said torsional spring being connected to said bushing.

5. A device according to claim 1, further including
a second brake actuating piston secured to an end of said spindle remote from said first piston to secure said spindle against rotational movement; and
a clamp ring; and wherein
said nut includes
a head adjacent the blind end of said bore, and
an encircling groove disposed in said head to receive said clamp ring to provide a slipper clutch with respect to said first piston.

6. A device according to claim 5, wherein
said spring includes
a conical spring disposed between a recess in said nut and an adjacent external end surface of said bushing.

* * * * *